United States Patent
Luo et al.

(10) Patent No.: US 11,647,536 B2
(45) Date of Patent: May 9, 2023

(54) METHODS, DEVICE AND COMPUTER-READABLE MEDIUM FOR DETERMINING TIMING ADVANCE

(71) Applicant: Nokia Technologies Oy, Espoo (FI)

(72) Inventors: Zhe Luo, Shanghai (CN); Tao Tao, Shanghai (CN); Jianguo Liu, Shanghai (CN); Gang Shen, Shanghai (CN); Jun Wang, Shanghai (CN); Zhuo Wu, Shanghai (CN); Yan Meng, Shanghai (CN)

(73) Assignee: Nokia Technologies Oy, Espoo (FI)

( * ) Notice: Subject to any disclaimer, the term of this patent is extended or adjusted under 35 U.S.C. 154(b) by 113 days.

(21) Appl. No.: 17/056,992

(22) PCT Filed: Jun. 6, 2018

(86) PCT No.: PCT/CN2018/090153
§ 371 (c)(1),
(2) Date: Nov. 19, 2020

(87) PCT Pub. No.: WO2019/232726
PCT Pub. Date: Dec. 12, 2019

(65) Prior Publication Data
US 2021/0160922 A1    May 27, 2021

(51) Int. Cl.
*H04W 74/00*  (2009.01)
*G06N 20/00*  (2019.01)
(Continued)

(52) U.S. Cl.
CPC .......... *H04W 74/008* (2013.01); *G06N 20/00* (2019.01); *H04L 5/0053* (2013.01); *H04W 56/0045* (2013.01); *H04W 74/0833* (2013.01)

(58) Field of Classification Search
None
See application file for complete search history.

(56) References Cited

U.S. PATENT DOCUMENTS

| 2009/0186613 A1 | 7/2009 | Ahn et al. |
| 2010/0040001 A1* | 2/2010 | Montojo ............... H04W 72/04 370/329 |

(Continued)

FOREIGN PATENT DOCUMENTS

| CN | 101295999 A | 10/2008 |
| CN | 101854646 A | 10/2010 |

(Continued)

OTHER PUBLICATIONS

Extended European Search Report received for corresponding European Patent Application No. 18921340.8, dated Dec. 21, 2021, 9 pages.

(Continued)

*Primary Examiner* — Rebecca E Song
(74) *Attorney, Agent, or Firm* — Harrington & Smith (57) ABSTRACT

In accordance with example embodiments of the invention there is at least a method, device, and computer readable medium for determining a Timing Advance. A method includes, the network device determines an estimation of a timing advance and an error of the timing advance based on a random access preamble received from the terminal device, the network device determines different communication modes with different lengths of overheads for the terminal device based on the error, and the network device can update the estimation of the timing advance based on feedback information from the terminal device. In this way, accuracy of the estimation of the timing advancing is improved.

13 Claims, 7 Drawing Sheets

(51) Int. Cl.
*H04L 5/00* (2006.01)
*H04W 56/00* (2009.01)
*H04W 74/08* (2009.01)

(56) References Cited

U.S. PATENT DOCUMENTS

| | | | |
|---|---|---|---|
| 2011/0117926 A1* | 5/2011 | Hwang | H04W 64/00 455/456.1 |
| 2012/0307811 A1 | 12/2012 | Kwon et al. | |
| 2014/0219109 A1* | 8/2014 | Shukair | H04W 24/08 370/252 |
| 2016/0316439 A1 | 10/2016 | Dinan | |
| 2019/0261364 A1* | 8/2019 | Takeda | H04L 27/26 |

FOREIGN PATENT DOCUMENTS

| | | |
|---|---|---|
| CN | 101946425 A | 1/2011 |
| CN | 107318157 A | 11/2017 |
| JP | 2016010009 A | 1/2016 |
| JP | 2016512666 A | 4/2016 |
| KR | 2011-0093402 A | 8/2011 |
| WO | 2011/043321 A1 | 4/2011 |
| WO | WO-2016161545 A1 * 10/2016 ............ H04W 56/00 |
| WO | WO-2019097406 A1 * 5/2019 ............... H04L 5/14 |

OTHER PUBLICATIONS

"PRACH Coverage Enhancements for MTC UEs", 3GPP TSG RAN WG1 #76, R1-140355, Agenda: 7.2.2.2.2, Samsung, Feb. 10-14, 2014, pp. 1-5.

International Search Report and Written Opinion received for corresponding Patent Cooperation Treaty Application No. PCT/CN2018/090153, dated Mar. 12, 2019, 10 pages.

Office Action received for corresponding Korean Patent Application No. 10-2021-7000077, dated Jan. 27, 2022, 4 pages of Office Action and 3 pages of translation available.

Office Action received for corresponding Japanese Patent Application No. 2020-567818, dated Mar. 29, 2022, 5 pages of Office Action and 3 pages of translation available.

* cited by examiner

METHODS, DEVICE AND COMPUTER-READABLE MEDIUM FOR DETERMINING TIMING ADVANCE

RELATED APPLICATION

This application claims priority to PCT Application No. PCT/CN2018/090153, filed on Jun. 6, 2018 which is incorporated herein by reference in its entirety.

FIELD

Embodiments of the present disclosure generally relate to communication techniques, and more particularly, to methods, devices and computer readable medium for determining a timing advance.

BACKGROUND

In communication systems, timing advance (TA) value corresponds to the length of time a signal takes to reach a network device from a terminal device. TA is a basic feature to support multi-user uplink (UL) multiplexing in a large cell. The network device informs different TA values to different terminal devices based on their propagation delays. The start time of UL transmissions for the terminal device are based on their TA values. As a result, UL transmissions from the terminal devices with different propagation delays can arrive at the network device simultaneously. Therefore, in the communication systems, especially in Long Term Evolution (LTE) and/or $5^{th}$ generation (5G) communication systems, accurate TA estimation is necessary to align the OFDM symbols of multiple terminal devices and avoid inter-symbol interference between terminal devices. The accuracy of TA estimation needs to be further improved.

SUMMARY

Generally, embodiments of the present disclosure relate to a method for determining a timing advance and the corresponding network device and terminal device.

In a first aspect, embodiments of the present disclosure provide a communication method. The method comprises: receiving, at a network device, a random access preamble from a terminal device. The method also comprises determining an estimation of a timing advance for the terminal device and an error of the estimation based on the random access preamble. The method further comprises determining, based on the error, a communication mode of the terminal device for a communication with the network device. The communication mode is associated with a length of an overhead of the terminal device for the communication. The method also comprises transmitting an indication of the communication mode to the terminal device for the communication.

In a second aspect, embodiments of the present disclosure provide a communication method. The method comprises transmitting, at a terminal device, a random access preamble to a network device. The random access preamble is used for determining an estimation of a timing advance for the terminal device and an error of the estimation. The method also comprises receiving, from the network device, an indication of a communication mode for a communication with the network device. The communication mode is determined based on the error and associated with a length of an overhead of the terminal device for the communication.

In a third aspect, embodiments of the disclosure provide a network device. The network device comprises: at least on processor; and a memory coupled to the at least one processor, the memory storing instructions therein, the instructions, when executed by the at least one processor, causing the network device to perform acts including: receiving, at the network device, a random access preamble from a terminal device. The acts also comprise determining an estimation of a timing advance for the terminal device and an error of the estimation based on the random access preamble. The acts further comprise determining, based on the error, a communication mode of the terminal device for a communication with the network device. The communication mode is associated with a length of an overhead of the terminal device for the communication. The acts also comprise transmitting an indication of the communication mode to the terminal device for the communication.

In a fourth aspect, embodiments of the disclosure provide a terminal device. The terminal device comprises: at least on processor; and a memory coupled to the at least one processor, the memory storing instructions therein, the instructions, when executed by the at least one processor, causing the terminal device to perform acts including: transmitting, at the terminal device, a random access preamble to a network device. The random access preamble is used for determining an estimation of a timing advance for the terminal device and an error of the estimation. The acts also comprise receiving, from the network device, an indication of a communication mode for a communication with the network device. The communication mode is determined based on the error and associated with a length of an overhead of the terminal device for the communication.

In a fifth aspect, embodiments of the disclosure provide an apparatus for communication. The apparatus comprises means for performing the method according to the first aspect.

In a sixth aspect, embodiments of the disclosure provide an apparatus for communication. The apparatus comprises means for performing the method according to the second aspect.

In a seventh aspect, embodiments of the disclosure provide a computer readable medium. The computer readable medium stores instructions thereon, the instructions, when executed by at least one processing unit of a machine, causing the machine to implement the method according to the first aspect.

In an eighth aspect, embodiments of the disclosure provide a computer readable medium. The computer readable medium stores instructions thereon, the instructions, when executed by at least one processing unit of a machine, causing the machine to implement the method according to the second aspect.

Other features and advantages of the embodiments of the present disclosure will also be apparent from the following description of specific embodiments when read in conjunction with the accompanying drawings, which illustrate, by way of example, the principles of embodiments of the disclosure.

BRIEF DESCRIPTION OF THE DRAWINGS

Embodiments of the disclosure are presented in the sense of examples and their advantages are explained in greater detail below, with reference to the accompanying drawings, where.

Throughout the figures, same or similar reference numbers indicate same or similar elements.

DETAILED DESCRIPTION OF EMBODIMENTS

The subject matter described herein will now be discussed with reference to several example embodiments. It should be understood these embodiments are discussed only for the purpose of enabling those skilled persons in the art to better understand and thus implement the subject matter described herein, rather than suggesting any limitations on the scope of the subject matter.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two functions or acts shown in succession may in fact be executed concurrently or may sometimes be executed in the reverse order, depending upon the functionality/acts involved.

As used herein, the term "communication network" refers to a network following any suitable communication standards, such as Long Term Evolution (LTE), LTE-Advanced (LTE-A), Wideband Code Division Multiple Access (WCDMA), High-Speed Packet Access (HSPA), and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) communication protocols, and/or any other protocols either currently known or to be developed in the future.

The term "a random access preamble" used herein refers to data transmitted to a network device which indicates a random access request. The term "timing advance" used herein refers to the length of time a signal takes to reach a network device from a terminal device.

Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system. For the purpose of illustrations, embodiments of the present disclosure will be described with reference to the scenario of vehicle-to-everything (V2X) communications in 5G communication system. It should be noted that embodiments of the present disclosure may be implemented in any suitable scenarios where low latency and/or high reliability are required.

The term "network device" includes, but not limited to, a base station (BS), a gateway, a management entity, and other suitable device in a communication system. The term "base station" or "BS" represents a node B (NodeB or NB), an evolved NodeB (eNodeB or eNB), a Remote Radio Unit (RRU), a radio header (RH), a remote radio head (RRH), a relay, a low power node such as a femto, a pico, and so forth.

The term "terminal device" includes, but not limited to, "user equipment (UE)" and other suitable end device capable of communicating with the network device. By way of example, the "terminal device" may refer to a terminal, a Mobile Terminal (MT), a Subscriber Station (SS), a Portable Subscriber Station, a Mobile Station (MS), or an Access Terminal (AT).

The term "circuitry" used herein may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation."

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

In conventional LTE and NR communication systems, TA estimation relies upon preambles transmitted on Physical Random Access Channel (PRACH), and the preambles are contiguous in the frequency domain. However, different from the licensed spectrum, the unlicensed spectrum has power spectral density (PSD) limitations and occupied bandwidth requirements. All transmissions, including preambles, on unlicensed spectrum should satisfy the limitations/requirements. As a result, for conventional communication systems, Block-Interleaved Frequency Division Multiplexing (B-IFDM) structure is accepted for UL transmissions. For example, a UL transmission occupies Physical Resource Blocks (PRBs) #0, 10, 20, 30, . . . , 90. Thus, preambles of unlicensed NR should also follow the B-IFDM structure.

For conventional LTE and 5G communication systems, the preambles are based on Zadoff-Chu (ZC) sequence, and the autocorrelation of the preamble contiguous in frequency domain has a main peak. The position of the main peak indicates the propagation delay of the received preamble. For example, if the main peak occurs at 3 us, the propagation delay (two-way) is equal to 3 us, and then the TA of the terminal device should be set to 3 us. The network device can easily locate the main peak for the preambles contiguous in frequency domain, since the main peak is much higher than the other peaks.

However, on the unlicensed spectrum, the preambles based on ZC-sequence are distributed on B-IFDM structure in frequency domain, and the autocorrelation of the preamble has multiple false peaks. If the conventional TA estimation scheme is used for B-IFDM-based preamble, those false peaks may cause the inaccuracy of TA estimation seriously, since the false peaks are easily confused with the main peak when noise or interference is added. Thus, the conventional TA estimation scheme cannot work well on unlicensed spectrum.

In order to at least in part solve above and other potential problems, embodiments of the present disclosure provide solutions for determining TA. According to embodiments of the present disclosure, the network device determines an estimation of a timing advance and an error of the timing advance based on a random access preamble received from the terminal device. The network device determines different communication modes with different lengths of overheads for the terminal device based on the error. The network device may update the estimation of the timing advance based on feedback information from the terminal device. In this way, accuracy of the estimation of the timing advancing is improved.

Now some example embodiments of the present disclosure are described below with reference to the figures. However, those skilled in the art would readily appreciate that the detailed description given herein with respect to these figures is for explanatory purpose as the present disclosure extends beyond theses limited embodiments.

Figure 1:
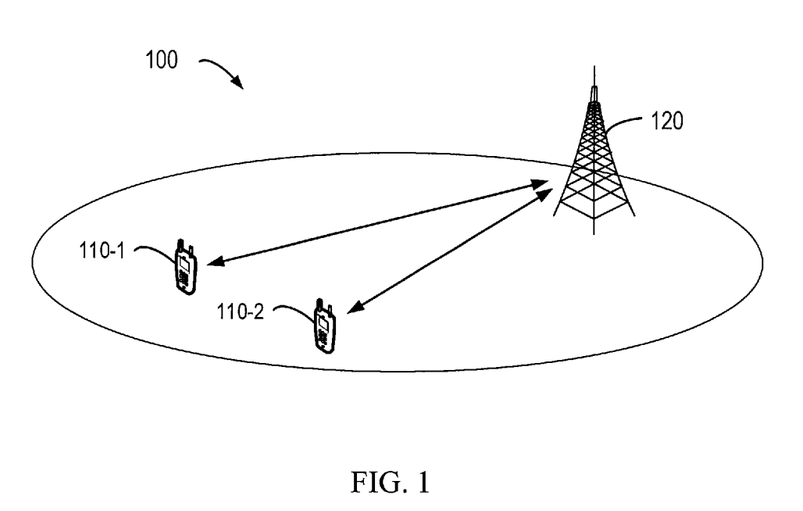
FIG. 1 illustrates a schematic diagram of a communication system according to embodiments of the present disclosure.

FIG. 1 illustrates a schematic diagram of a communication system in which embodiments of the present disclosure can be implemented. The communication system 100, which is a part of a communication network, includes a network device 120, and one or more terminal devices 110-1 and 110-2. It is to be understood that the communication system 100 may include any suitable number of terminal devices. It should be noted that the communication system 100 may also include other elements which are omitted for the purpose of clarity. The network device 120 may communicate with the terminal devices 110. It is to be understood that the number of network devices and terminal devices shown in FIG. 1 is given for the purpose of illustration without suggesting any limitations. The communication system 100 may include any suitable number of network devices and terminal devices.

Communications in the communication system 100 may be implemented according to any proper communication protocol(s), including, but not limited to, cellular communication protocols of the first generation (1G), the second generation (2G), the third generation (3G), the fourth generation (4G) and the fifth generation (5G) and on the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, including but not limited to: Code Divided Multiple Address (CDMA), Frequency Divided Multiple Address (FDMA), Time Divided Multiple Address (TDMA), Frequency Divided Duplexer (FDD), Time Divided Duplexer (TDD), Multiple-Input Multiple-Output (MIMO), Orthogonal Frequency Divided Multiple Access (OFDMA) and/or any other technologies currently known or to be developed in the future.

Figure 2:
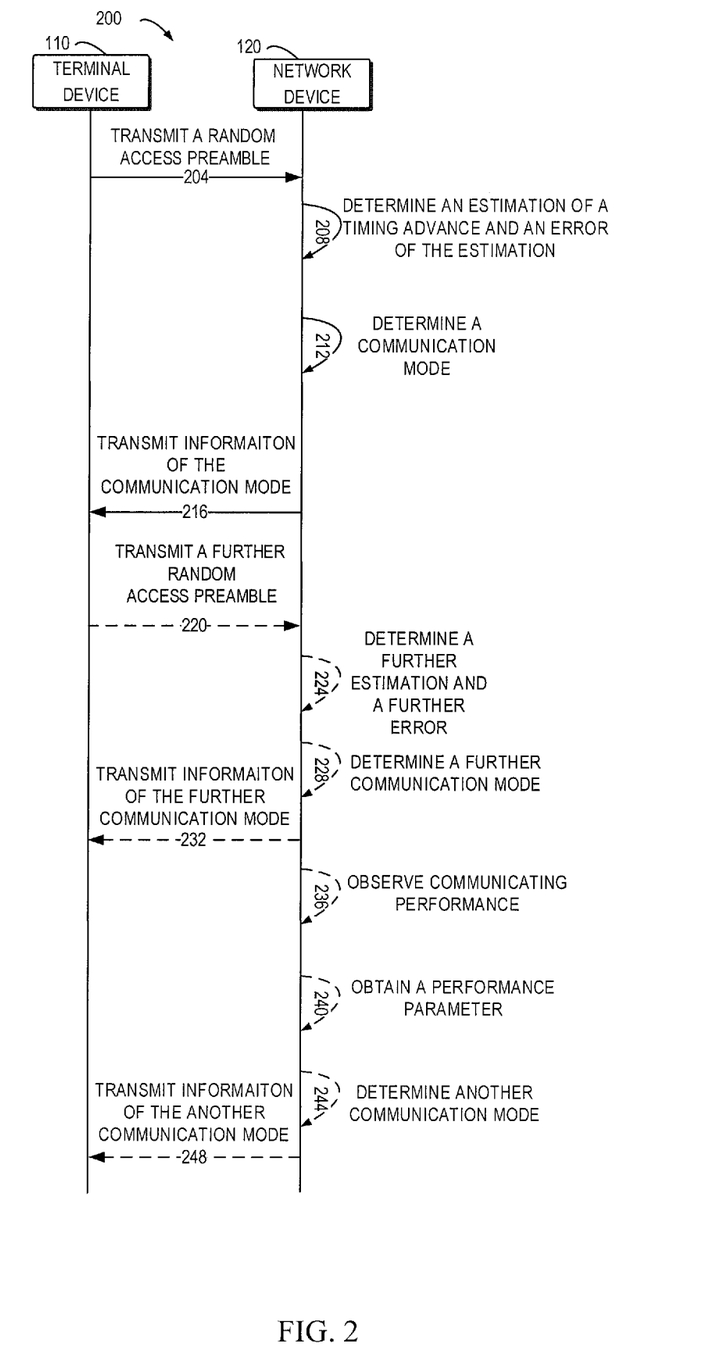
FIG. 2 illustrates a schematic diagram of interactions between the terminal device and the network device according to embodiments of the present disclosure.
Figure 3:
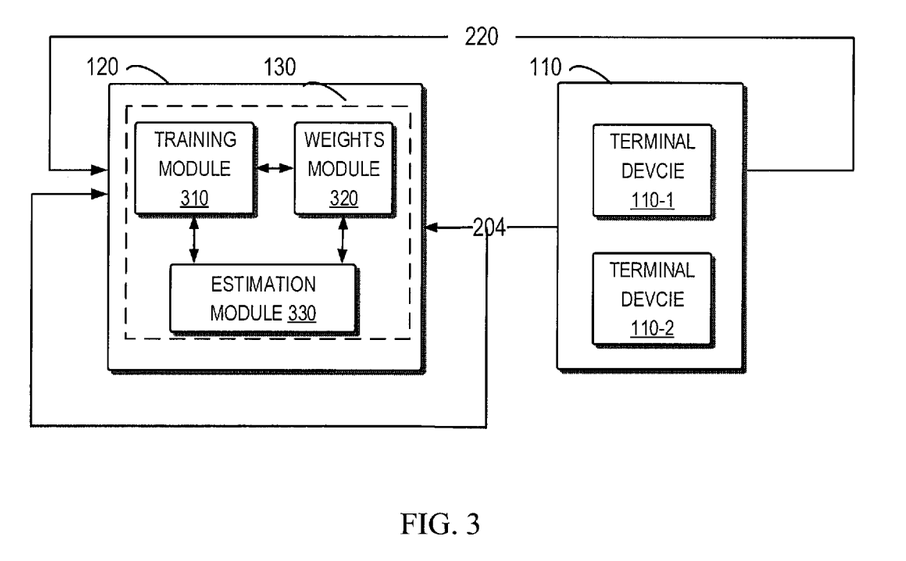
FIG. 3 illustrates a schematic diagram of a structure TA estimation scheme according to embodiments of the present disclosure.

FIG. 2 illustrates a schematic diagram of interactions 200 between the terminal device 110 and the network device 120. The interactions may be implemented using a machine learning structure (for example, a neural network). FIG. 3 illustrates a schematic diagram of a structure TA estimation scheme using a neural network according to embodiments of the present disclosure. The neural network 130 may be locally implemented at the network device 120. The neural network 130 may be remotely implemented. As shown in FIG. 3, the neural network 130 may comprise a training module 310, a weights module 320 and an estimation module 330. It should be noted that the neural network 130 is only an example for illustrations.

Only for the purpose of illustrations, some embodiments of the present disclosure are described with reference to FIG. 3. It should be noted that embodiments of the present disclosure may be implemented using any suitable structures. For example, embodiments of the present disclosure may also be implemented using an expert system. It is to be understood that the present disclosure is not limited in this aspect.

The terminal device 110 transmits 204 a random access preamble to the network device 120. The preamble may be transmitted using PRACH resources. In some embodiments, the terminal device 110 may transmit the preamble using a carrier with a narrow bandwidth. The network device 120 determines 208 an estimation of a timing advancing and an error of the estimation. In an example embodiment, the network device 120 may calculate the correlation of the original preamble which is without delay or distortion with the received signal on the PRACH in time domain. The correlation is regarded as the input to the neural network. The input to the neural network is processed by layers of the neural network. For example, as shown in FIG. 3, the estimation module 330 determines the estimation of the timing advancing and the error using initial weights.

The network 120 determines 212 a communication mode of the terminal device 110. In some embodiments, with reference to FIG. 3, the neural network 130 may indicate whether the estimation is accurate using the error.

In some embodiments, the network device 120 may compare the error with predetermined threshold error. If the error is less than the predetermined threshold error, it indicates that the estimation is accurate. If the error is greater than the predetermined threshold error, it indicates that the estimation is not accurate.

In an example embodiment, if the network device 120 determines that the estimation is inaccurate, the network device 120 may determine a communication mode with a long overhead. For example, the network device 120 may determine that the terminal device 110 should have a long cyclic prefix.

In another example embodiment, if the network device 120 determines that the estimation is accurate, the network device 120 may determine a communication mode with a short overhead. For example, the network device 120 may determine that the terminal device should have a short cyclic prefix.

The network device 120 transmits 216 information of the communication mode to the terminal device 110. In some embodiments, if the communication mode is with a long overhead, the network device 120 may schedule the terminal device 110 to transmit 220 a further random access preamble in a contention-free PRACH resource. Since there is no interference and low noise in the contention-free PRACH resource, the network device 120 may determine 224 an accurate estimation of the timing advance and a small error. The network device may determine 228 the communication mode with a shorter overhead than the previous communication mode and transmit 232 information of the communication mode. The training module 310 may train the neural network 130 using the previous estimation of the TA, the accurate estimation of the TA and their corresponding random access preambles.

In other embodiments, if the terminal device 110 fails to perform UL transmission using the determined communication mode, the terminal device 110 may transmit 220 the further random access preamble to the network device 120. The network device 120 may determine 224 a further estimation of the TA and a further error. If the further error is less than the threshold error, the network device may determine 228 the further communication mode with a shorter overhead and transmit 232 information of the communication mode. The terminal device 110 may transmit preambles and receive re-estimations of the TA for several times until the terminal device 110 performs the UL transmission successfully.

The neural network 130 may be trained using the estimations of the TA. For example, the network device 120 may obtain the correlation which leads to the previous inaccurate TA estimation and the accurate estimation of the TA. The network device 120 may feed the correlation and the accurate estimation to the training module 310 to update the weights module 320. By way of example, the training module 310 may calculate the inaccurate estimation of the TA based on input correlation with current weights. The weights of the final layer of the neural network 130 may be updated by gradient descent way according to the difference between the inaccurate estimation of the TA and the accurate estimation of the TA. Based on the updated weights of the final layer and the accurate estimation of the TA, the desired input of the final layer which is the desired output of the previous layer may be obtained. The weights of the previous layer are updated using the difference between the desired output and the actual output.

In this way, the network device may determine the overhead of the terminal device based on the accuracy of estimating the TA, which allows the terminal device with inaccurate TA performing UL transmissions. Further, the accuracy of estimating the TA may be improved since the network device 120 updates its data dynamically using the historical information.

In some embodiments, if the communication mode is with a short overhead, the network device 120 may observe 236 the performance of the terminal device 110. For example, the network device 120 may observe the symbol interference rate of the terminal device 110. The network device 120 may observe the NACK received from the terminal device 110.

The network device 120 may obtain 240 a communication parameter of the terminal device 110. In an example embodiment, the communication parameter may indicate the symbol interference rate. Alternatively or in addition, the communication parameter may indicate the NACK rate. If the communication parameter exceeds a threshold parameter, the network device 120 may determine 244 another communication mode with a longer overhead. The network device may transmit 248 information of the communication mode to the terminal device 110.

Figure 4:
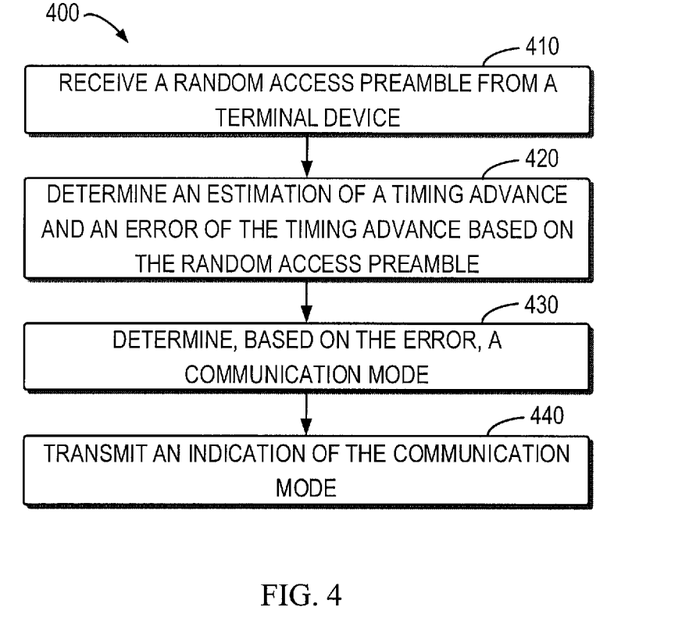
FIG. 4 illustrates a flow chart of a method implemented at a network device according to embodiments of the present disclosure.

FIG. 4 illustrates a flow chart of a method 400 according to embodiments of the present disclosure. The method 400 may be implemented at the network device 120.

At block 410, the network device 120 receives a random access preamble from the terminal device 110. The preamble may be transmitted using PRACH resources. In some embodiments, the terminal device 110 may transmit the preamble using a carrier with a narrow bandwidth.

At block 420, the network device 120 determines an estimation of a timing advance and an error of the estimation of the TA based on the random access preamble. In some embodiments, the estimation of the TA and the error of the TA are determined using a neural network.

At block 430, the network device 120 determines a communication mode of the terminal device 110 for a communication with the network device 120. In some embodiments, the network device 120 may compare the error with predetermined threshold error. If the error is less than the predetermined threshold error, it indicates that the estimation is accurate. If the error exceeds the predetermined threshold error, it indicates that the estimation is not accurate.

If the estimation is accurate, the network device 120 may determine a communication mode (referred to as "a first communication mode") with a short overhead as the communication mode. In some embodiments, the network device may obtain performance parameters of the terminal device 110. The performance parameter may indicate a symbol interference rate. Alternatively or in addition, the performance parameter may indicate a NACK rate.

If the performance parameter exceeds a predetermined parameter which means that the terminal device 110 fails to perform UL transmissions with the determined overhead, the network device 120 may change the communication mode to another communication mode (referred to as "a second communication mode") with a longer overhead.

If the estimation is inaccurate, the network device 120 may determine a communication mode (referred to as "a third communication mode") with a long overhead. The network device 120 may schedule the terminal device 110 to transmit a further random access preamble. Alternatively or in addition, the terminal device 110 may transmit a further random access preamble spontaneously.

In this embodiment, the network device 120 may determine a further estimation of a further TA and a further error based on the further random access preamble. If the further error is less than the threshold error, the network device may change the third communication mode to a fourth communication mode with a shorter overhead.

At block 440, the network device transmits an indication of the communication mode to the terminal device 110.

Figure 5:
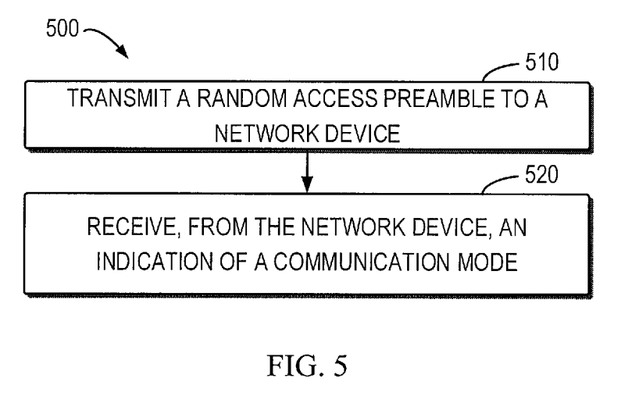
FIG. 5 illustrates a flow chart of a method implemented at a terminal device according to embodiments of the present disclosure.

FIG. 5 illustrates a flow chart of a method 500 according to embodiments of the present disclosure. The method 500 may be implemented at the terminal device 110.

At block 510, the terminal device 110 transmits a random access preamble to the network device 120. The preamble may be transmitted using PRACH resources.

In some embodiments, the terminal device 110 may transmit the preamble using a carrier with a narrow bandwidth.

An estimation of a timing advance and an error of the estimation of the TA are determined based on the random access preamble. In some embodiments, the estimation of the TA and the error of the TA are determined using a neural network.

At block 520, the terminal device 110 receives an indication of a communication mode for a communication with the network device 120. The communication mode is determined based on the error.

In some embodiments, the error is compared with predetermined threshold error. If the error is less than the predetermined threshold error, it indicates that the estimation is accurate. If the error is less than the predetermined threshold error, it indicates that the estimation is not accurate.

If the estimation is accurate, the terminal device 110 may receive the indication of a communication mode (referred to as "a first communication mode") with a short overhead as the communication mode. In some embodiments, the network device may obtain performance parameters of the terminal device 110. The performance parameter may indicate a symbol interference rate. Alternatively or in addition, the performance parameter may indicate a NACK rate.

If the performance parameter exceeds a predetermined parameter which means that the terminal device 110 fails to perform UL transmissions with the determined overhead, the terminal device 110 may receive a further indication indicating changing the communication mode to another communication mode (referred to as "a second communication mode") with a longer overhead.

If the estimation is inaccurate, the terminal device 110 may receive the indication of a communication mode (referred to as "a third communication mode") with a long overhead. The network device 120 may schedule the terminal device 110 to transmit a further random access preamble. Alternatively or in addition, the terminal device 110 may transmit a further random access preamble spontaneously.

In this embodiment, if the further error is less than the threshold error, the terminal device 110 may receive a further indication indicating the third communication mode to a fourth communication mode with a shorter overhead the network device 120 may determine a further estimation of a further TA and a further error based on the further random access preamble.

In some embodiments, an apparatus for performing the method 400 (for example, the network device 120) may comprise respective means for performing the corresponding steps in the method 400. These means may be implemented in any suitable manners. For example, it can be implemented by circuitry or software modules.

In some embodiments, the apparatus comprises: means for receiving, at a network device, a random access preamble from a terminal device; means for determining an estimation of a time advance for the terminal device and an error of the estimation based on the random access preamble; means for determining, based on the error, a communication mode of the terminal device for a communication with the network device, the communicating mode associated with a length of an overhead of the terminal device for the communication; and means for transmitting an indication of the communication mode to the terminal device for the communication.

In some embodiments, the means for determining the communication mode comprises: means for comparing the error with a threshold error; and means for in response to determining the error being less than the threshold error, determining a first communication mode with a short overhead as the communication mode.

In some embodiments, the apparatus further comprises: means for obtaining a performance parameter of the terminal device, the performance parameter indicating at least one of: a symbol interference rate and a NACK rate; and means for in response to the performance parameter exceeding a threshold parameter, changing the first communication mode to a second communication mode with a longer overhead.

In some embodiments, the means for determining the communication mode comprises: means for comparing the error with a threshold error; and means for in response to determining the error exceeding a threshold error determining a third communication mode with a long overhead as the communication mode.

In some embodiments, the apparatus further comprises: means for receiving a further random access preamble from the terminal device; means for determining a further estimation of a further time advance for the terminal device and a further error of the further estimation based on the further random access preamble; and means for in response to the further error being less than the threshold error, changing the third communication mode to a fourth communication mode with a shorter overhead.

In some embodiments, the estimation and the error are determined using a neural network.

In some embodiments, an apparatus for performing the method 500 (for example, the terminal device 110) may comprise respective means for performing the corresponding steps in the method 500. These means may be implemented in any suitable manners. For example, it can be implemented by circuitry or software modules.

In some embodiments, the apparatus comprises: means for transmitting, at a terminal device, a random access preamble to a network device, the random access preamble being used for determining an estimation of a time advance for the terminal device and an error of the estimation; and means for receiving, from the network device, an indication of a communication mode for a communication with the network device, the communication mode being determined based on the error and associated with a length of an overhead of the terminal device for the communication.

In some embodiments, the means for receiving the indication comprises means for in response to the error being less than a threshold error receiving the indication of a first communication mode with a short overhead as the communication mode.

In some embodiments, the apparatus further comprises means for in response to a performance parameter of the terminal device exceeding a threshold parameter, receiving a further indication indicating changing the first communication mode to a second communication mode with a longer overhead, the performance parameter indicating at least one of: a symbol interference rate and a NACK rate.

In some embodiments, the means for receiving the indication comprises means for in response to the error exceeding a threshold error, receiving the indication of a third communication mode with a long overhead as the communication mode.

In some embodiments, the apparatus further comprises means for transmitting a further random access preamble to the network device, the further random access preamble being used for determining a further estimation of a further time advance for the terminal device and an further error of the further estimation; means for in response to the further error being less than the threshold error, receiving a further indication indicating changing the third communication mode to a fourth communication mode with a shorter overhead.

In some embodiments, the estimation and the error are determined using a neural network.

Figure 6:
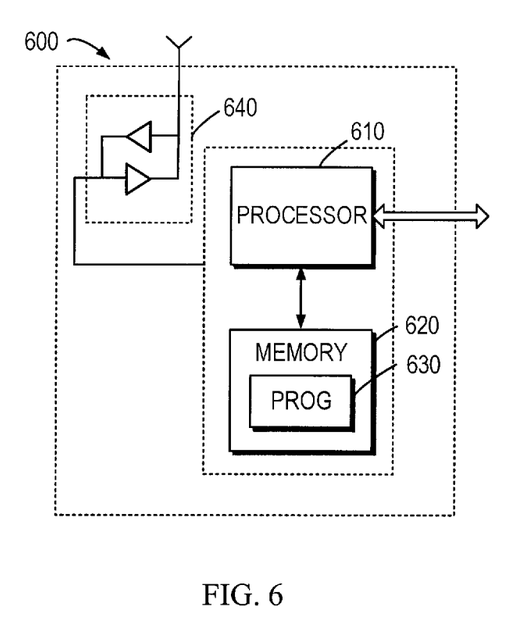
FIG. 6 illustrates a schematic diagram of a device according to embodiments of the present disclosure.

FIG. 6 is a simplified block diagram of a device 600 that is suitable for implementing embodiments of the present disclosure. The device 600 may be implemented at the network device 120. The device 600 may also be implemented at the terminal device 110. As shown, the device 600 includes one or more processors 610, one or more memories 620 coupled to the processor(s) 610, one or more transmitters and/or receivers (TX/RX) 640 coupled to the processor 610.

The processor 610 may be of any type suitable to the local technical network, and may include one or more of general purpose computers, special purpose computers, microprocessors, digital signal processors (DSPs) and processors based on multicore processor architecture, as non-limiting examples. The device 5600 may have multiple processors, such as an application specific integrated circuit chip that is slaved in time to a clock which synchronizes the main processor.

The memory 620 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples.

The memory 620 stores at least a part of a program 630. The TX/RX 640 is for bidirectional communications. The TX/RX 640 has at least one antenna to facilitate communication, though in practice an Access Node mentioned in this application may have several ones. The communication interface may represent any interface that is necessary for communication with other network elements.

The program 630 is assumed to include program instructions that, when executed by the associated processor 610, enable the device 600 to operate in accordance with the embodiments of the present disclosure, as discussed herein with reference to FIGS. 2-5. That is, embodiments of the present disclosure can be implemented by computer software executable by the processor 610 of the device 600, or by hardware, or by a combination of software and hardware.

Figure 7A:
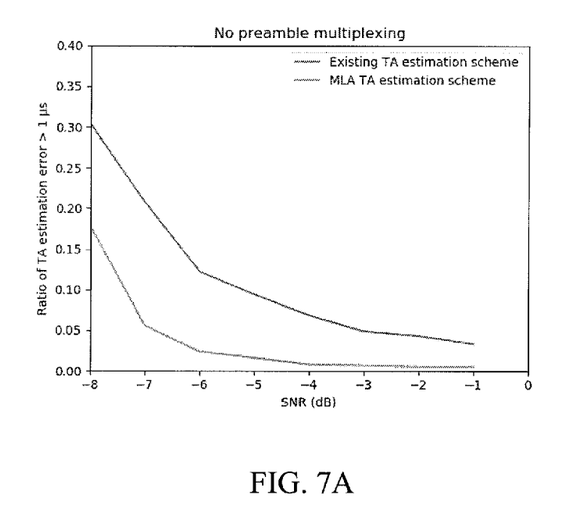
FIGS. 7A and 7B illustrate simulation results according to embodiments of the present disclosure.
Figure 7B:
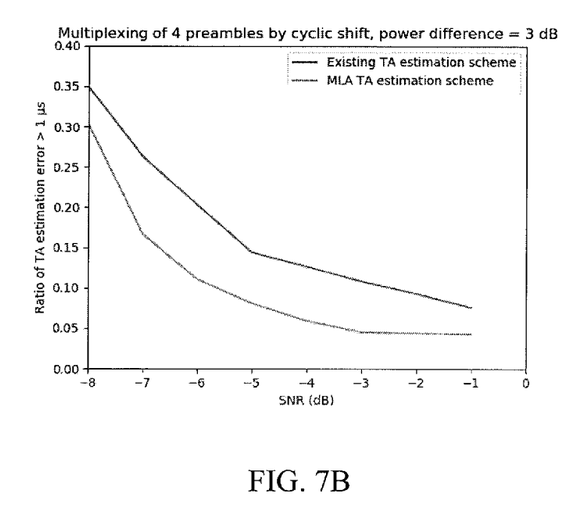

FIGS. 7A and 7B illustrate simulation results according to embodiments of the present disclosure. FIG. 7A shows the scenario where only one preamble is transmitted in a PRACH resource simultaneously. FIG. 7B shows the scenario where four preambles are transmitted in a PRACH resource simultaneously. It can be seen that embodiments of the present disclosure provide more accurate TA estimation than the conventional TA estimation.

While this specification contains many specific implementation details, these should not be construed as limitations on the scope of any disclosure or of what may be claimed, but rather as descriptions of features that may be specific to particular embodiments of particular disclosures. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Various modifications, adaptations to the foregoing exemplary embodiments of this disclosure may become apparent to those skilled in the relevant arts in view of the foregoing description, when read in conjunction with the accompanying drawings. Any and all modifications will still fall within the scope of the non-limiting and exemplary embodiments of this disclosure. Furthermore, other embodiments of the disclosures set forth herein will come to mind to one skilled in the art to which these embodiments of the disclosure pertain having the benefit of the teachings presented in the foregoing descriptions and the associated drawings.

Therefore, it is to be understood that the embodiments of the disclosure are not to be limited to the specific embodiments disclosed and that modifications and other embodiments are intended to be included within the scope of the appended claims. Although specific terms are used herein, they are used in a generic and descriptive sense only and not for purpose of limitation.

What is claimed is:

1. A communication method, comprising:
receiving, at a network device, a random access preamble from a terminal device;
determining an estimation of a timing advance for the terminal device and an error of the estimation based on the random access preamble;
determining, based on the error, a communication mode of different communication modes associated with different lengths of overhead for the terminal device for a communication with the network device,
wherein the determined communication mode is associated with a length of an overhead of the terminal device for the communication based on the error;
comparing the error with a predetermined threshold error to identify whether or not the estimation of the timing advance is accurate based on whether the error exceeds or is less than the predetermined threshold; and
transmitting an indication of the determined communication mode to the terminal device for the communication.

2. The method of claim 1, wherein
in response to determining the error being less than the predetermined threshold error, determining an overhead of a first communication mode as the determined communication mode, or
in response to determining the error is exceeding the predetermined threshold error, determining a third communication mode with a long overhead as the determined communication mode.

3. The method of claim 1, further comprising:
obtaining a performance parameter of the terminal device, the performance parameter indicating at least one of: a symbol interference rate and a negative acknowledgement rate; and
in response to the performance parameter exceeding a threshold parameter, changing the first communication mode to a second communication mode with a longer overhead than the overhead of the first communication mode.

4. The method of claim 1, wherein based on the error being less than the predetermined threshold error it is identified that the estimation of the timing advance is accurate, or wherein based on the error exceeding the predetermined threshold error it is identified that the estimation of the timing advance is not accurate.

5. The method of claim 1, further comprising:
receiving a further random access preamble from the terminal device;
determining a further estimation of a further timing advance for the terminal device and a further error of the further estimation based on the further random access preamble; and
in response to the further error being less than the predetermined threshold error, changing the third communication mode to a fourth communication mode with a shorter overhead than the third communication mode.

6. The method of claim 1, wherein the estimation and the error are determined using a neural network.

7. A non-transitory computer readable medium storing instructions thereon, the instructions, when executed by at least one processing unit of a machine, causing the machine to perform the method according to claim 1.

8. A network device, comprising:
at least one processor; and
a memory coupled to the at least one processor, the memory storing instructions therein, the instructions, when executed by the at least one processor, causing the network device to perform acts comprising:
receiving, at the network device, a random access preamble from a terminal device;
determining an estimation of a timing advance for the terminal device and an error of the estimation based on the random access preamble;
determining, based on the error, a communication mode of different communication modes associated with different lengths of overhead for the terminal device for a communication with the network device based on the error,
wherein the determined communication mode is associated with a length of an overhead of the terminal device for the communication;
comparing the error with a predetermined threshold error to identify whether or not the estimation of the timing advance is accurate based on whether the error exceeds or is less than the predetermined threshold; and
transmitting an indication of the determined communication mode to the terminal device for the communication.

9. The network device of claim 8, wherein the memory storing instructions coupled to the at least one processor is configured to cause the network device to perform:
determining the communication mode comprises:
comparing the error with a threshold error; and
in response to determining the error being less than the threshold error, determining that an overhead of a first communication mode is shorter than an overhead of a second communication mode as the communication mode, or
in response to determining the error exceeding the threshold error, determining a third communication mode with a longer overhead than a fourth communication mode as the communication mode.

10. The network device of claim 9, wherein the memory storing instructions coupled to the at least one processor is configured to cause the network device to perform:
obtaining a performance parameter of the terminal device, the performance parameter indicating at least one of: a symbol interference rate and a negative acknowledgement rate; and
in response to the performance parameter exceeding a threshold parameter, changing the first communication mode to a second communication mode with a longer overhead than the overhead of the first communication mode.

11. The network device of claim 8, wherein based on the error being less than the predetermined threshold error it is identified that the estimation of the timing advance is accurate, or wherein based on the error exceeding the predetermined threshold error it is identified that the estimation of the timing advance is not accurate.

12. The network device of claim 8, wherein the memory storing instructions coupled to the at least one processor is configured to cause the network device to perform:
receiving a further random access preamble from the terminal device;
determining a further estimation of a further timing advance for the terminal device and a further error of the further estimation based on the further random access preamble; and
in response to the further error being less than the error, changing the third communication mode to the fourth communication mode with a shorter overhead.

13. The network device of claim 8, wherein the estimation and the error are determined using a neural network.

* * * * *